United States Patent
Dusina et al.

(10) Patent No.: US 10,458,174 B2
(45) Date of Patent: Oct. 29, 2019

(54) DOOR CLOSING SYSTEM

(71) Applicant: GM GLOBAL TECHNOLOGY OPERATIONS LLC, Detroit, MI (US)

(72) Inventors: Frank J. Dusina, White Lake, MI (US); Aaron S. Pfau, Highland, MI (US); Scott M. Damman, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 196 days.

(21) Appl. No.: 15/696,277

(22) Filed: Sep. 6, 2017

(65) Prior Publication Data

US 2019/0071916 A1  Mar. 7, 2019

(51) Int. Cl.
| | |
|---|---|
| *E05F 15/73* | (2015.01) |
| *B60W 30/18* | (2012.01) |
| *G05D 1/00* | (2006.01) |
| *E05F 13/00* | (2006.01) |
| *E05B 81/00* | (2014.01) |
| *E05B 83/36* | (2014.01) |

(52) U.S. Cl.
CPC .............. *E05F 15/73* (2015.01); *B60W 30/18* (2013.01); *B60W 30/18045* (2013.01); *E05F 13/00* (2013.01); *G05D 1/0055* (2013.01); *G05D 1/0088* (2013.01); *E05B 81/00* (2013.01); *E05B 83/36* (2013.01); *E05F 2015/763* (2015.01); *E05F 2015/765* (2015.01); *E05Y 2400/44* (2013.01); *E05Y 2400/45* (2013.01); *E05Y 2900/531* (2013.01)

(58) Field of Classification Search
CPC ...... E05F 15/73; G05D 1/0088; B60W 30/18; B60W 30/18045
USPC ...................................... 701/49, 23
See application file for complete search history.

(56) References Cited

U.S. PATENT DOCUMENTS

| | | | |
|---|---|---|---|
| 2017/0030131 A1* | 2/2017 | Elie ................. | E05F 15/60 |
| 2017/0247927 A1* | 8/2017 | Elie ................. | E05F 15/60 |
| 2017/0292313 A1* | 10/2017 | Herman .......... | E05F 15/73 |

\* cited by examiner

*Primary Examiner* — Nadeem Odeh
(74) *Attorney, Agent, or Firm* — Lorenz & Kopf, LLP (57) ABSTRACT

Methods and systems for autonomously closing an open door of a vehicle are disclosed. A door closing system for a vehicle includes a sensor system and an autonomous driving system. The sensor system determines if a door of the vehicle is open and determines if a surrounding of the vehicle is free of obstacles in a predetermined range. The autonomous driving system instructs the vehicle to move if a door of the vehicle is open and if the predetermined range of the surrounding of the vehicle is free of obstacles, such that the door is closed as a result of the movement of the vehicle.

18 Claims, 4 Drawing Sheets

DOOR CLOSING SYSTEM

TECHNICAL FIELD

The technical field generally relates to autonomous vehicles, and more particularly relates to systems and methods for closing a door of a vehicle, and even more particularly relates to a vehicle implementing such systems and methods.

INTRODUCTION

An autonomous vehicle is a vehicle that is capable of sensing its environment and navigating with little or no user input. An autonomous vehicle senses its environment using one or more sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

With an autonomous vehicle being used for ride sharing for example, there is the potential for open doors after users have finished their session. In order for the vehicle to move onto other ride sharing customers, the doors need to be closed first.

Accordingly, it is desirable to provide a door closing system for a vehicle. In addition, it is desirable to provide door closing systems for autonomous vehicles. Furthermore, other desirable features and characteristics of the present invention will become apparent from the subsequent detailed description and the appended claims, taken in conjunction with the accompanying drawings and the foregoing technical field and background.

SUMMARY

A door closing system for closing a door of a vehicle is provided. In one embodiment, the system includes a sensor system and an autonomous driving system. The sensor system is configured to determine if a door of the vehicle is open and to determine if a surrounding of the vehicle is free of obstacles in a predetermined range. The autonomous driving system is configured to cause the vehicle to move if a door of the vehicle is open and if the predetermined range of the surrounding of the vehicle is free of obstacles, such that the door is closed as a result of the movement of the vehicle.

In various embodiments, the autonomous driving system is configured to move the vehicle in a door closing direction and in the following to decelerate the vehicle, such that the door is closed as a result of decelerating the vehicle.

In various embodiments, the autonomous driving system is configured to move the vehicle in the door closing direction and in the following to apply a force to the vehicle in an opposite direction to the door closing direction, such that the door is closed as a result of the force applied to the vehicle.

In various embodiments, the autonomous driving system is configured to determine a torque request for closing an open door depending on an inclination angle of a vehicle's position, wherein the autonomous driving system is configured to move the vehicle based on the torque request.

In various embodiments, the door closing system further includes at least one actuator configured to latch the door after the door is closed In various embodiments, the door closing system further includes an interface configured to connect with an external user and to receive instructions to move the vehicle to another location in case the surrounding of the vehicle is not free of obstacles.

In various embodiments, the door closing system further includes an acoustical device for warning the surrounding if the vehicle moves.

In various embodiments, the sensor system comprises Light Detection and Ranging (LiDAR) sensors.

According to an aspect, a vehicle with a door closing system is provided. In various embodiments, the vehicle is provided with one or a combination of various embodiments of the door closing system outlined above.

A method for operating a vehicle is provided. In one embodiment, the method includes determining, by a processor, if a door of the vehicle is open and if a surrounding of the vehicle is free of obstacles in a predetermined range. Further, the method includes moving, by an actuator system, the vehicle if the door of the vehicle is open and if the predetermined range of the surrounding of the vehicle is free of obstacles, such that the door is closed as a result of the movement of the vehicle.

It is noted that in various embodiments, the method contains steps which correspond to the functions of one or more of the various embodiments of the door closing system described above.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
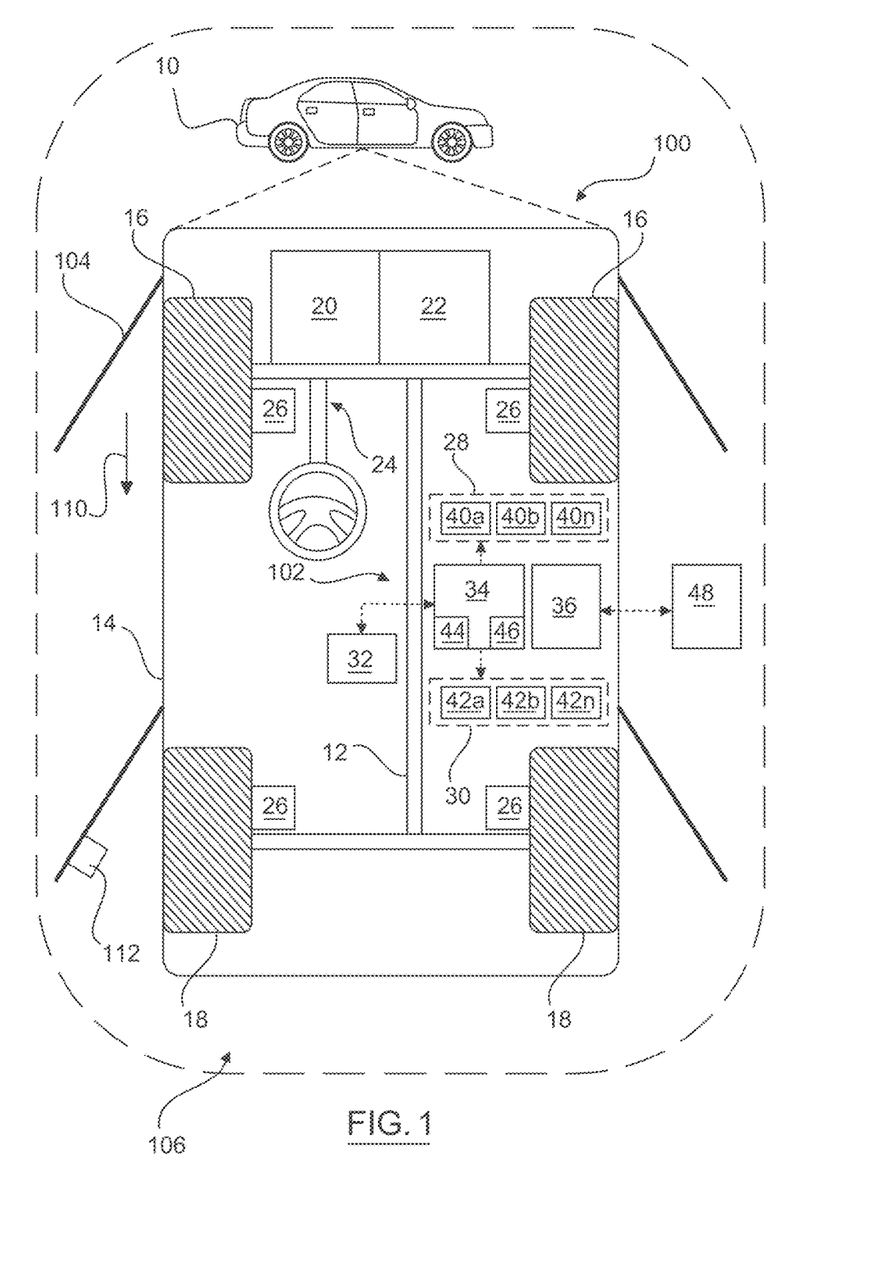
FIG. 1 is a functional block diagram of vehicle having a door closing system, in accordance with an embodiment.

With reference to FIG. 1, a vehicle 10 is shown having a door closing system 100 in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

In various embodiments, the data storage device 32 includes a map module which provides map data to the controller 34 and the autonomous driving system 70. In various embodiments, the map module accesses locally stored map data and/or map data received from a remote map data provider. For example, the map data provider provides map data via the communication system 36.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, an acoustical device etc. (not numbered).

Figure 2:
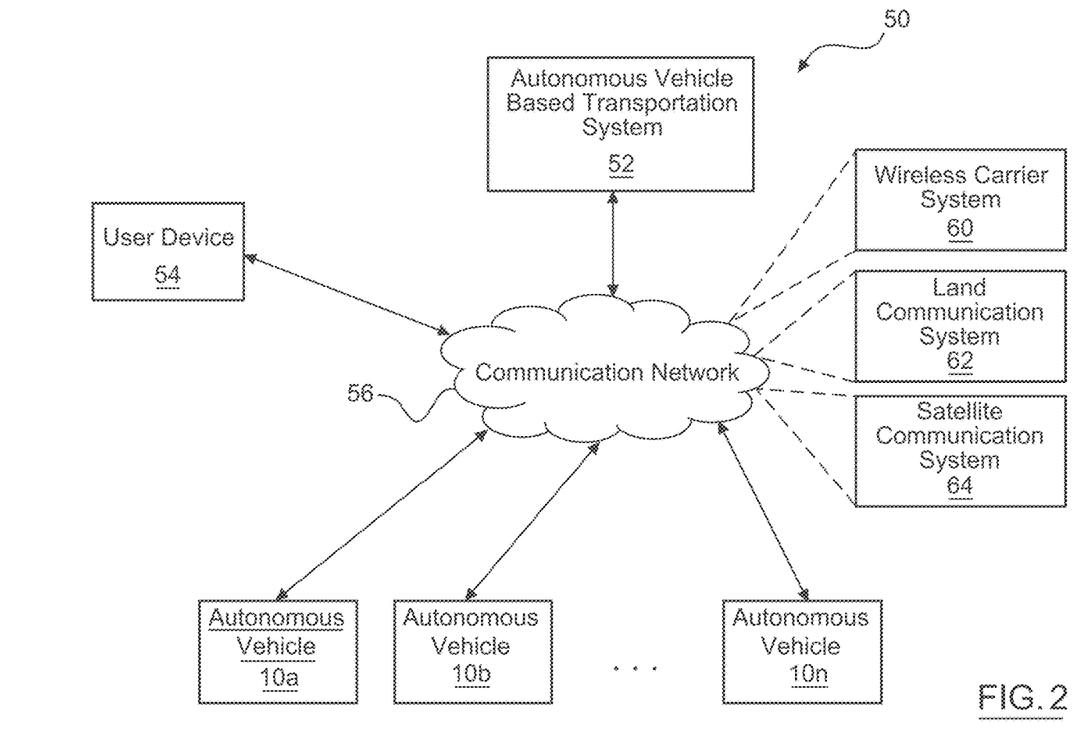
FIG. 2 is a functional block diagram illustrating a transportation system having one or more autonomous vehicles of FIG. 1, in accordance with an embodiment.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, the door closing system 100 of the vehicle 10 includes at least some sensors of the sensor system 28 and the autonomous driving system 70. The controller 34 is configured to carry out the functions of the door closing system in accordance with one or a combination of embodiments described herein.

In an example, the autonomous driving system comprises an electronic brake control module (EBCM) for applying the brake. With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10*a*-10*n* as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
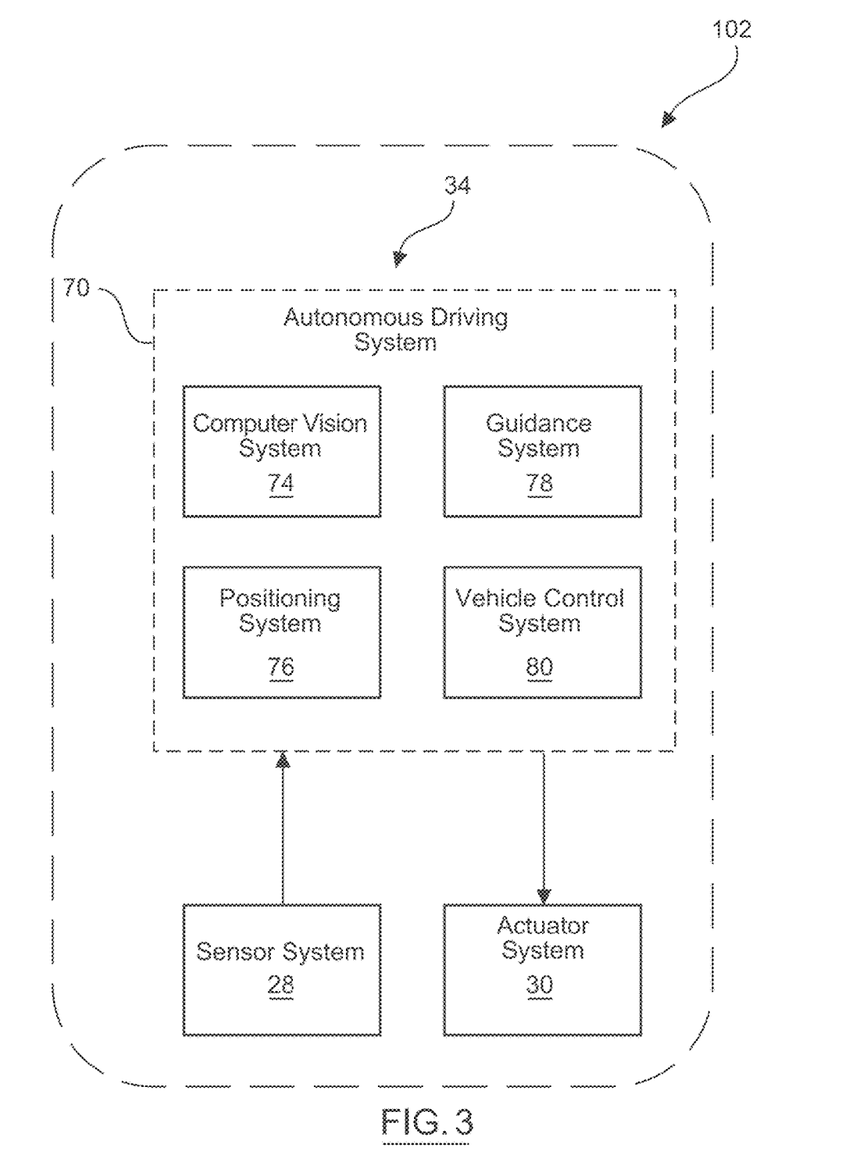
FIG. 3 is a functional block diagram illustrating an autonomous driving system, in accordance with an embodiment.

In accordance with various embodiments, controller 34 implements an autonomous driving system (ADS) 70 as shown in FIG. 3 having a door closing system 102. That is, suitable software and/or hardware components of controller 34 (e.g., processor 44 and computer-readable storage device 46) are utilized to provide an autonomous driving system 70 that is used in conjunction with vehicle 10. In various embodiments, the controller 34 shown in FIG. 3 is implemented in accordance with what is described herein with reference to the controller 34.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The computer vision system 74 may also be referred to as a sensor fusion system, as it enables visualization of input from several sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

The vehicle control system 80 is configured to communicate a vehicle control output to the actuator system 30. In an exemplary embodiment, the actuators 42 include a steering control, a shifter control, a throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

In various embodiments, the door closing system 102 includes at least some of the sensors of the sensor system 28 and embodies at least some of the functions of the autonomous driving system 70. In various embodiments, the sensor system 28 is configured to determine if a door 104 (FIG. 1) of the vehicle is open and to determine if a surrounding 106 (FIG. 1) of the vehicle 10 is free of obstacles in a predetermined range. The autonomous driving system 70 is configured to cause the vehicle 10 to move if a door 104 (FIG. 1) of the vehicle 10 is open and if the predetermined range of the surrounding of the vehicle 10 is free of obstacles, such that the door is closed as a result of the movement of the vehicle.

The surrounding 106 (FIG. 1) of the vehicle 10 is an area in the close vicinity of the vehicle 10 and is also referred to as an environment surrounding the vehicle. In various embodiments, the surrounding 106 is shaped like a circle or an ellipse or corresponds to the shape of the vehicle 10 with the boundary lines of the surrounding area 106 having a predetermined distance to the outer boundary lines of the vehicle 10.

Referring again to FIG. 1, the door closing system 102 is included in or part of the vehicle 10. In various embodiments, the controller 34 is configured to carry out the functions of the door closing system of one or a combination of embodiments described herein. Controller 34 is configured to determine if at least one of the doors 104 is open and to further determine if the surrounding 106 of the vehicle 10 is free of obstacle. If at least one of the doors 104 is open and if the surrounding 106 is free of obstacles, the controller 34 instructs the vehicle 10 to execute a movement such that the open door is closed as a result of the inherent inertia of the open door and the movement of the vehicle 10. In various embodiments, the movement of the vehicle 10 is executed within the boundary lines of the surrounding 106 which is examined for obstacles.

In various embodiments, the predetermined range of the surrounding 106 has a radius between 2 to 50 m. In various embodiments, the radius is 15 m.

In various embodiments, the door closing system detects a presence of persons, cars, and other objects within the surrounding 106 around the vehicle 10.

It is noted that the movement of the vehicle to close an open door could also be referred to as door closing maneuver. The term "autonomous" means that the vehicle is performing the movement autarkic, i.e. without intervention of a human, or semi-automatic, i.e., with some human interactions during the movement of the vehicle.

In various embodiments, the autonomous driving system 70 instructs the vehicle to move in a door closing direction and in the following to decelerate, such that the door is closed as a result of decelerating the vehicle.

The term "door closing direction" 110 can also be referred to as the rearward moving direction of the vehicle. The door closing direction is opposite to a door opening direction. Basically, an open door closes as a result of its inherent inertia if a force is applied opposite to the door closing direction. For example, in the illustration shown in FIG. 1, the door closing direction is downward (rearward direction of the vehicle). Any force moving the vehicle upward (forward direction of the vehicle) will cause an open door to move in the door closing direction 110 such that it pivots around a door hinge or door mount (not shown, generally located at the coupling of the door to body 14 of vehicle 10) towards the body 14 of the vehicle 10. The force referred to herein for closing an open door may be a decelerating force when moving the vehicle rearwards or an accelerating force in a forward direction.

Decelerating the vehicle may happen by braking or by applying an acceleration force in the opposite direction, i.e., counter to the door closing direction 110.

In various embodiments, the movement of the vehicle is an autonomous vehicle movement consisting in performing quick movement in rearward and forward direction of the vehicle or the other way around and then braking using the door's inertia for closing the door. In various embodiments, the door closing maneuver is performed as at least one rearward movement phase and at least one deceleration phase of the rearward movement (deceleration closes the door), at least one rearward movement phase followed by a subsequent forward moving phase (transition from rearward movement to forward movement closes the door), a sequence of multiple rearward and forward movement phases, especially in case the open door is not closed after the first rearward/forward movement. In various embodiments, the door closing maneuver includes a movement in forward direction only, e.g., in case the forward only motion provides sufficient torque to close the door. In particular, this is conceivable if the vehicle is on a nose up grade (inclination angle of a longitudinal axis of the vehicle unequal 0°, see below, front of the vehicle is higher than rear) and/or if there is an obstacle in close proximity behind the vehicle preventing a rearward movement. The acceleration in forward direction is determined such that, based on the inertia of the open door, enough torque is provided to close the door.

In various embodiments, the autonomous driving system instructs the vehicle to move in the door closing direction and in the following to apply a force to the vehicle in an opposite direction to the door closing direction, such that the door is closed as a result of the applied force to or by the vehicle.

In various embodiments, the autonomous driving system 70 determines a torque request for closing the door 104 depending on an inclination angle of a vehicle's position (not shown). In various embodiments, the autonomous driving system 70 instructs the vehicle 10 to move based on the determined torque request.

The required torque for closing an open door may vary depending on a location or position of the vehicle 10. For example, if the vehicle is parked such that the front wheels 16 are uphill and the rear wheels 18 are downhill, the torque required for closing the door having a door closing direction towards rear of the vehicle is generally lower in comparison to the vehicle being parked in a flat plane. This is, because the force of gravity acts in this scenario in the door closing direction. In contrast thereto, if the front wheels 16 are downhill and the rear wheels 18 are uphill, the torque required for closing an open door in the door closing direction 110 is higher, as the force of gravity acts opposite to the door closing direction. The torque required for closing an open door can be varied by varying the value of the deceleration of the vehicle 10 when moving backwards or by varying the value of the acceleration in forward direction.

In various embodiments, if the vehicle stays on a flat plane, a torque is requested to close the door, which is applied on the door by the movement of the vehicle. If the vehicle is parked in an uphill or downhill position, other torque values are requested to close an open door.

The inclination angle of the vehicle's position relates to the angle of a longitudinal axis (in a lengthwise direction, from front to back) with respect to a horizontal line that is perpendicular to the earth gravitational vector.

In various embodiments, when the torque request is determined, the autonomous driving system controls the vehicle according to the determined torque request, i.e., in a specific forward and rearward movement followed by braking the vehicle or accelerating it in the opposite direction. In various embodiments, the torque request is predefined in a database depending on the inclination angle of the vehicle's parking position. For example, a lookup-table is provided in the data storage device 32 having several values of the vehicle's inclination angle (the inclination angle can be measured by the sensor system 28) and assigned thereto a torque value required for closing an open door, respectively.

In various embodiments, the movement of the vehicle 10 during the door closing maneuver for closing the open door 104 of the vehicle is set by the allowable articulation range of the at least one open door 104. In various embodiments, when the vehicle's surrounding 106 is narrow or small, the autonomous driving system determines the torque request adapted to this surrounding situation and moves the vehicle accordingly. A required force for closing an open door may be caused even if the surrounding 106 is small, as the force results from the deceleration and/or acceleration values, and not from the size of the free space (distance of the vehicle 10 to an obstacle in the vehicle's environment) for performing the door closing maneuver.

In various embodiments, at least one actuator 112 is provided to latch the door 104 after the door 104 is closed.

In various embodiments, the actuator 112 is arranged at the closing mechanism of the door. For example, the actuator is an electrically and/or hydraulically controlled actuator. For example, a second actuator (not shown) is provided to ensure full locking of the at least one door. In various embodiments, the actuator 112 is part of the actuator system 30 and is controlled by the controller 34.

In various embodiments, the door closing system 102 further comprises an interface (for example, part of the communication system 36) configured to connect with an external user (not shown) and to receive instructions to move the vehicle 10 to another location, in case the surrounding 106 of the vehicle 10 is not free of obstacles, i.e., if the vehicle 10 cannot perform the door closing maneuver at its current position.

Another location relates to a different location as the vehicle's current position.

The term "user" is related to an expert or operator, i.e., a person supervising the door closing, if necessary.

In an example, the door closing system transmits an information to an operator, via the interface, that the movement for closing the open door by vehicle's movement cannot be executed, so that the expert can attempt to reposition the car. In various embodiments, the autonomous driving system 70 instructs the vehicle 10 to move autonomously to a location where the door closing system 102 executes its functions in accordance with one or a combination of embodiments described herein. In various embodiments, the expert intervenes and moves the vehicle to the location where the door closing system executes its function. In various embodiments, in case the door cannot be closed, the interface receives a message that the vehicle requires a diagnosis.

In various embodiments, the sensor system 28 includes Light Detection and Ranging (LiDAR) sensors. Lidar (also called LIDAR, LiDAR, and LADAR) is a surveying method that measures distance to a target by illuminating that target with a pulsed laser light, and measuring the reflected pulses with a sensor. Differences in laser return times and wavelengths can then be used to make digital 3D-representations of the target. Lidar sometimes can also be referred to as laser scanning and 3D scanning, with terrestrial, airborne, and mobile applications.

In various embodiments, LIDAR sensors are arranged such that the door is in the field of view of the LIDAR sensors. In various embodiments, a LIDAR sensor sits atop the roof of vehicle 10. In various embodiments, LIDAR sensors are provided in the interior of the vehicle in capsule of sorts to allow for scanning of the interior of the vehicle. In various embodiments, other sensors (cameras, articulating radar, etc.) are utilized to determine if the door is open. In various embodiments, other sensors like presence sensors or cameras are utilized for occupant detection, i.e., to detect if an occupant is present in the interior of the vehicle 10 after using the ride sharing service. In various embodiments, a Lidar image is provided to ensure that the vehicle is safe to perform the door closing maneuver and determine a current door position.

In various embodiments, the door closing system 102 analyzes additional vehicle sensors to determine a current pitch both forward/rearward and lateral to adjust movements, if necessary.

In various embodiments, a vehicle 10 is provided with the door closing system 102 and the various embodiments outlined above.

Figure 4:
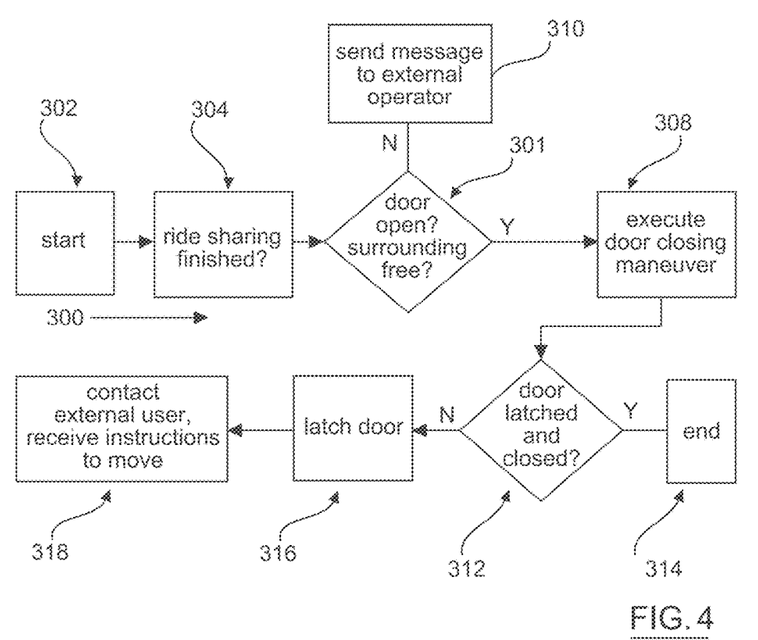
FIG. 4 is a flow diagram illustrating the functions of a door closing system, in accordance with an embodiment.

With reference to FIG. 4, an exemplary embodiment of a flow diagram 300 of the functions of a door closing system 102 illustrated in FIG. 1 and FIG. 3 is shown. At a starting point 302, one or more doors are left open after a drive with the vehicle 10 is completed. Before the door closing system 102 performs the door closing maneuver of the vehicle to close the open door 104, the door closing system 102 confirms in a step 304 if a user is finished with ride sharing service. However, this step is optional. Then, in a next step 306, the door closing system 102 determines if the door 104 of the vehicle 10 is open and if the surrounding 106 is free of obstacles. If yes, in a next step 308, the door closing system 102 causes the vehicle to execute the door closing maneuver, such that the open door is closed as a result of the movement of the vehicle. If the surrounding 106 is not free of obstacles, in step 310, a message is sent to an external operator to move the vehicle to an alternative location where the door closing maneuver can be performed. In a next step 312, the door closing system determines if the door is fully latched and closed. If yes, in step 314, the door closing maneuver of the vehicle ends. If the door is not latched, in step 316, the at least one actuator 112 is configured to latch the door. Additionally, if the door is not closed, the door closing maneuver may be executed once again, i.e., the functions of steps 306, 308, 310 are repeated. If the door is still not latched, in step 318, the door closing system connects with an external user and receives instructions to move the vehicle to another location.

Figure 5:
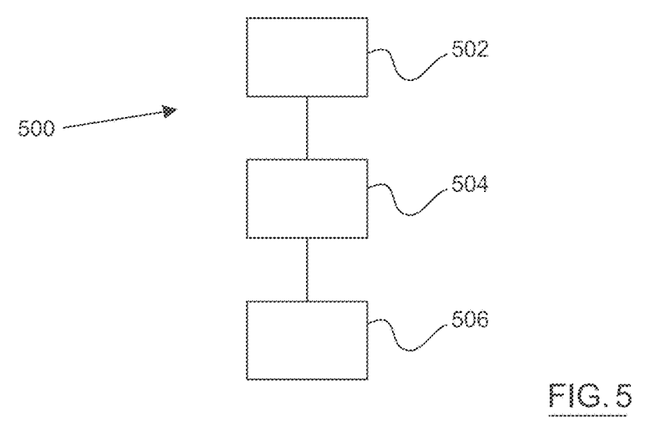
FIG. 5 is a flowchart illustrating the steps of a door closing method, in accordance with an embodiment.

With reference to FIG. 5, a method 500 in accordance with various embodiments is shown. In step 502, it is determined if a door of the vehicle is open. In step 504, it is further determined if a surrounding of the vehicle is free of obstacles in a predetermined range. In a further step 506, the vehicle is moved, especially to execute a door closing maneuver as described with reference to one or multiple embodiments of the door closing system 102 (FIGS. 1, 3, and 4) disclosed herein, if the door of the vehicle is open and if the predetermined range of the surrounding of the vehicle is free of obstacles, such that the door is closed as a result of the movement of the vehicle.

In various embodiments, the moving of the vehicle comprises the steps of moving the vehicle in a door closing direction 110 (FIG. 1) and subsequently decelerating the vehicle, such that the open door is closed as a result of decelerating the vehicle.

In various embodiments, the moving of the vehicle comprises the steps of moving the vehicle in the door closing direction 110 (FIG. 1) and in the following applying a force to the vehicle in an opposite direction to the door closing direction, such that the door is closed as a result of the applied force of the vehicle.

In various embodiments, the torque required for closing the door is determined depending on an inclination angle of a vehicle's position. The autonomous driving system moves the vehicle based on the required torque.

In various embodiments, at least one actuator is instructed to latch the door, in case the door of the vehicle is not fully latched and closed.

In various embodiments, a further step is provided for connecting with an external user and receiving instructions to move the vehicle to another location, in case the surrounding of the vehicle is not free of obstacles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A door closing system for a vehicle, the door closing system comprising:
    a sensor system;
    an autonomous driving system;
    wherein the sensor system is configured to, by a processor, determine if a door of the vehicle is open and to determine if a surrounding of the vehicle is free of obstacles in a predetermined range; and
    wherein the autonomous driving system is configured to, by a processor, cause the vehicle to move when the door of the vehicle is open and when the predetermined range of the surrounding of the vehicle is free of obstacles, such that the door is closed as a result of the movement of the vehicle.

2. The door closing system of claim 1, wherein the autonomous driving system is configured to, by the processor, move the vehicle in a door closing direction and to decelerate the vehicle, such that the door is closed as a result of decelerating the vehicle.

3. The door closing system of claim 1, wherein the autonomous driving system is configured to, by the processor, move the vehicle in a door closing direction and to apply a force to the vehicle in an opposite direction to the door closing direction, such that the door is closed as a result of the force applied to the vehicle.

4. The door closing system of claim 1, wherein the autonomous driving system is configured to, by the processor, determine a torque request for closing the open door depending on an inclination angle of a position of the vehicle, wherein the autonomous driving system is configured to move the vehicle based on the torque request.

5. The door closing system of claim 1, further comprising at least one actuator configured to latch the door after the door is closed.

6. The door closing system of claim 1, further comprising an acoustic actuator configured to warn the surrounding when the vehicle moves.

7. The door closing system of claim 1, wherein the sensor system comprises Light Detection and Ranging (LiDAR) sensors.

8. A vehicle, comprising:
    a sensor system;
    a controller comprising an autonomous driving system;
    wherein the sensor system is configured to determine if a door of the vehicle is open and to determine if a surrounding of the vehicle is free of obstacles in a predetermined range; and
    wherein the autonomous driving system is configured to, by a processor, cause the vehicle to move when the door of the vehicle is open and when the predetermined range of the surrounding of the vehicle is free of obstacles, such that the door is closed as a result of the movement of the vehicle.

9. The vehicle of claim 8, wherein the autonomous driving system is configured to, by the processor, determine a torque request for closing the open door depending on an inclination angle of a position of the vehicle, wherein the autonomous driving system is configured to move the vehicle based on the torque request.

10. The vehicle of claim 8, further comprising at least one actuator configured to latch the door after the door is closed.

11. The vehicle of claim 8, further comprising an acoustic actuator configured to warn the surrounding when the vehicle moves.

12. The vehicle of claim 8, wherein the sensor system comprises Light Detection and Ranging (LiDAR) sensors.

13. A method for operating a vehicle, the method comprising the steps:
    determining, by a processor, when a door of the vehicle is open;
    determining, by the processor, when a surrounding of the vehicle is free of obstacles in a predetermined range; and
    moving, by an actuator system, the vehicle when the door of the vehicle is open and when the predetermined range of the surrounding of the vehicle is free of obstacles, such that the door is closed as a result of the movement of the vehicle.

14. The method of claim 13, wherein the moving of the vehicle comprises the steps of moving, by the actuator system, the vehicle in a door closing direction and subsequently decelerating the vehicle, such that the open door is closed as a result of decelerating the vehicle.

15. The method of claim 13, wherein the moving of the vehicle comprises the steps of moving, by the actuator system, the vehicle in a door closing direction and applying a force to the vehicle in an opposite direction to the door closing direction, such that the door is closed as a result of the force applied to the vehicle.

16. The method of claim 13, further comprising the step:
    determining, by the processor, a torque request for closing the door depending on an inclination angle of a position of the vehicle, and moving the vehicle based on the determined torque request.

17. The method of claim 13, further comprising the step: controlling, by the processor, at least one actuator to latch and close the door in case the door of the vehicle is not fully latched and closed.

18. The method of claim 13, further comprising:
    connecting, by the processor, with an external user and receiving instructions to move the vehicle to another location in case the surrounding of the vehicle is not free of obstacles.

* * * * *